US007011346B2

(12) United States Patent
James, Sr.

(10) Patent No.: US 7,011,346 B2

(45) Date of Patent: Mar. 14, 2006

(54) BIMINI TWIST JIG

(76) Inventor: Harold F. James, Sr., P.O. Box 673, Burlington, NJ (US) 08016

(*) Notice: Subject to any disclaimer, the term of this patent is extended or adjusted under 35 U.S.C. 154(b) by 0 days.

(21) Appl. No.: 10/910,708

(22) Filed: Aug. 3, 2004

(65) Prior Publication Data

US 2006/0028022 A1 Feb. 9, 2006

(51) Int. Cl.
*D03J 3/00* (2006.01)

(52) U.S. Cl. ........................................ 289/17; 289/18.1

(58) Field of Classification Search .................... 289/2, 289/17, 18.1; 7/106; 43/1, 4

See application file for complete search history.

(56) References Cited

U.S. PATENT DOCUMENTS 2,773,713 A * 12/1956 Smalley ........................ 289/17
2,947,558 A * 8/1960 Bethune, Jr. .................... 289/2
3,787,081 A * 1/1974 Macy .......................... 289/17
3,877,737 A * 4/1975 Chappell ..................... 289/17
4,403,797 A * 9/1983 Ragland, Jr. ................. 289/17
4,573,719 A * 3/1986 Aldridge ...................... 289/17
4,607,869 A * 8/1986 Bersche ....................... 289/17
4,871,200 A * 10/1989 Ryder et al. .................. 289/17
5,240,295 A * 8/1993 Spencer ...................... 289/1.5
5,480,406 A * 1/1996 Nolan et al. ................ 606/139
5,690,369 A * 11/1997 Steck, III .................... 289/17
5,690,370 A * 11/1997 Steck, III .................... 289/17
6,322,112 B1 * 11/2001 Duncan ...................... 289/1.5

* cited by examiner

*Primary Examiner*—Gary L. Welch
(74) *Attorney, Agent, or Firm*—Stuart M. Goldstein

(57) ABSTRACT

A jig for tying Bimini twists has two fishing line sections. The first section, which extends from the second section, has clip attachments near its end for retaining the fishing line to be tied. Similarly, the second section has a clip attachment near its end also, for retaining the fishing line. The second section also has outwardly extending arm members, slotted at their ends and held in position by a spring which creates a compressive force within the second section. An adjustable nut and bolt against which the spring provides the compressive force, is used to adjustably move the arms inward and outward in relation to the second section. While the jig can be constructed as one unitary member with first and second sections, it is contemplated that the sections would be separable and that the first section would extend out of the second section. Additionally, a fishing line extension component is provided for tying Bimini twists for larger loops. The extension is stored within the first and second sections when not in use.

45 Claims, 7 Drawing Sheets

BIMINI TWIST JIG

BACKGROUND OF THE INVENTION

The Bimini twist is considered to be the most important knot in fishing. It is used primarily for double-line leaders and offshore trolling, but is also popular with inshore and fly fishermen or for any fishing need which must achieve 100% knot strength, i.e. where the knot retains 100% of the original strength of the line. The Bimini twist allows for the doubling of a fishing line by creating a long loop of fishing line which becomes stronger than the line itself. However, it is a fairly complex knot to tie, requiring a number of steps, in which the fisherman must not only use both hands, but may also use one of his feet and sometimes his lower body. Tying a Bimini twist longer than about five feet usually requires two people.

Since an improperly tied Bimini twist can result in lost fish and equipment, it is imperative that the knot be tied correctly. The difficulty in tying the Bimini twist, however, often results in poorly tied knots or in the fisherman not even attempting to tie the knot at all.

Surprisingly, there are relatively few jigs especially developed to assist in tying Bimini twists. One such device is that which is described in U.S. Pat. No. 4,871,200. This device, referred to as a “fixture” in the patent, is a fairly complex piece of machinery with many parts. It is impractical to use, not portable, and its design makes its manufacture expensive. Other knot jigs are not configured to facilitate the tying of Bimini twists.

SUMMARY OF THE INVENTION

It is thus the object of the present invention to overcome the disadvantages and limitations of previous fishing jigs.

It is the object of the present invention to provide a fishing jig specifically designed to tie the Bimini twist.

It is a further object of the present invention to provide a Bimini twist jig which is relatively easy to use and, properly used, always results in the tying of a perfect Bimini twist.

It is still another object of the present invention to provide a Bimini twist jig which is simple and cost effective to manufacture.

It is still a further object of the present invention to provide a Bimini twist jig which is to be used to tie knots which can secure short loops as well as those which are longer in length, i.e. over five feet.

It is a further object of the present invention to provide a Bimini twist jig which can be used by one person to tie Bimini twists for loops of any length.

These and other objects are accomplished by the present invention, a Bimini twist jig which has two fishing line sections. The first section, which extends from the second section, has clip attachments near its end for retaining the fishing line to be tied. Similarly, the second section has a clip attachment near its end also, for retaining the fishing line. The second section also has outwardly extending arm members, slotted at their ends and held in position by a spring which creates a compressive force within the second section. An adjustable nut and bolt against which the spring provides the compressive force, is used to adjustably move the arms inward and outward in relation to the second section. While the jig can be constructed as one unitary member with first and second sections, it is contemplated that the sections would be separable and that the first section would extend out of the second section. Additionally, a fishing line extension component is provided for tying Bimini twists for larger loops. The extension is stored within the first and second sections when not in use.

Novel features which are considered as characteristic of the invention are set forth in particular in the dependent claims. The invention, itself, however, both as to its design, construction and use, together with the additional features and advantages thereof, are best understood upon review of the following detailed description with reference to the accompanying drawings.

DETAILED DESCRIPTION OF THE INVENTION

Figure 1:
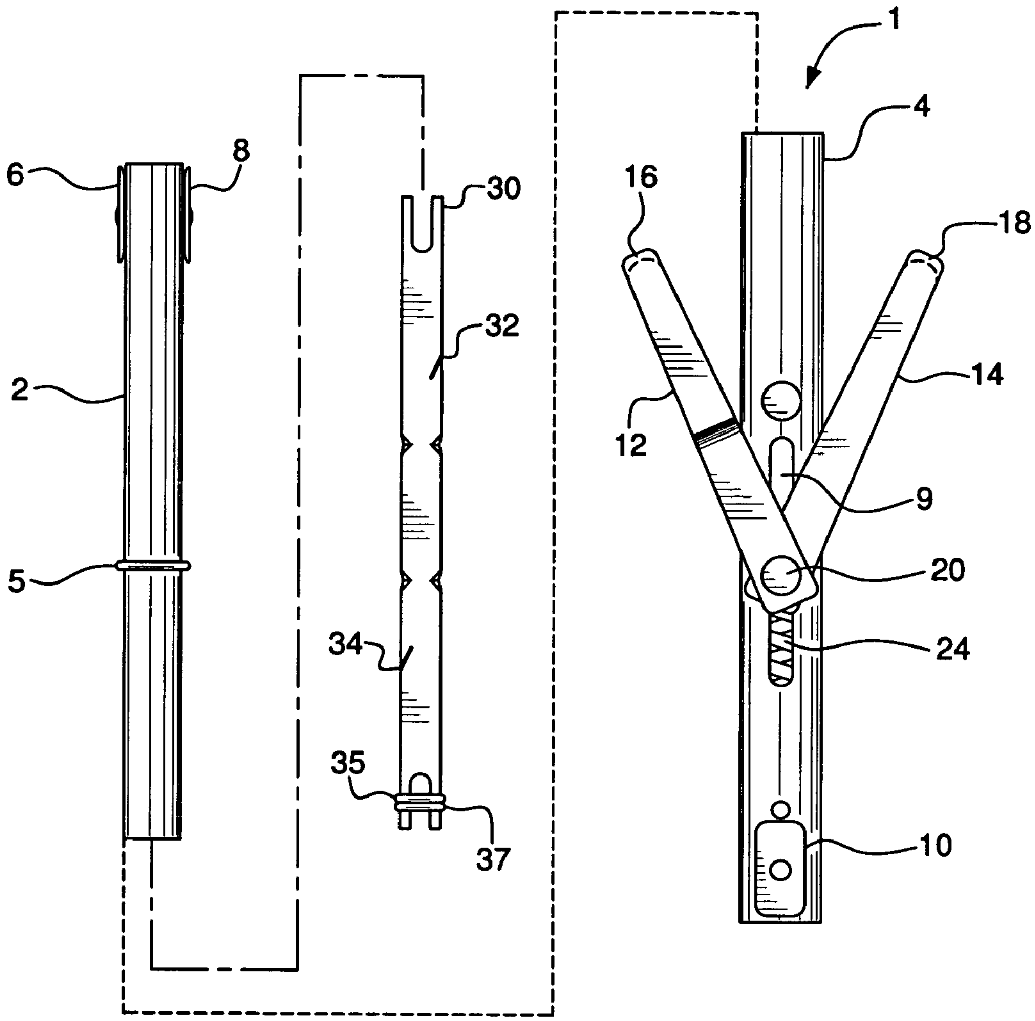
FIG. 1 shows the separable components of the Bimini twist jig of the present invention.
Figure 2:
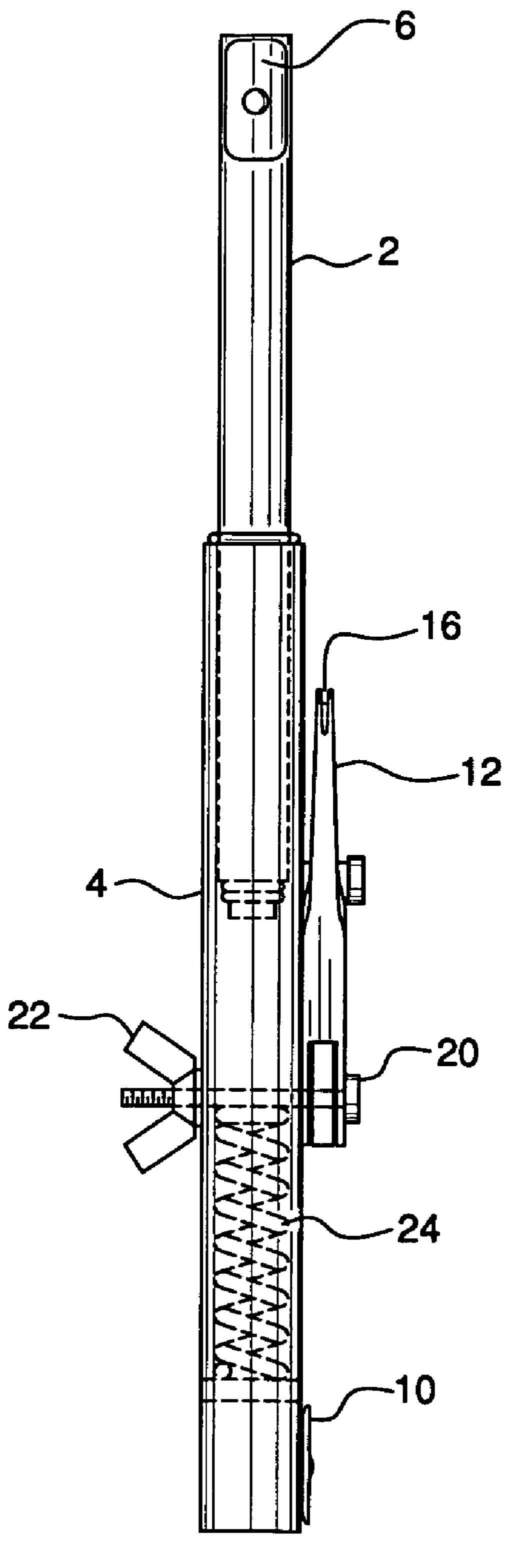
FIG. 2 is a side view of the components of the Bimini twist jig of the present invention stored in place.

Bimini twist jig 1 of the present invention comprises tubular first section 2 and tubular second section 4. While jig 1 can be made as a single, unitary body with an upper first section and a lower second section, the preferred embodiment provides that sections 2 and 4 be separable components, since section 4 is tubular in nature, section 2 is insertable into and extends out from section 4, as best seen in FIG. 2. Section 4 is slideably adjustable within section 2, which allows the length of jig 1 to be readily adjustable. Sealing ring 5 on section 2 maintains section 2 in the desired position in relation to section 4.

Section 2 has attachment clips 6 and 8 near its upper end. Attachment clip 10 is located near the lower end of section 4. Slotted opening 9 is provided within section 4. Section 4 also has outwardly extending arms 12 and 14, each with slots 16 and 18 respectively, formed at their ends. Arms 12 and 14 are connected by nut 20 and wing bolt 22 to the body of section 4. Bolt 20 extends through opening 9 and is configured to move up and down within the opening. Spring 24 provides a biased, compressive force against bolt 20 which serves to hold arms 12 and 14 in position. When wing nut 22 is tight on bolt 20, arms 12 and 14 remain fixed in position on section 4, against the compressive force of spring 24. When wing nut 22 is loosened, the compressive force of spring 24, acting on bolt 20, will cause the bolt to be pushed upwards within opening 9. This results in arms 12 and 14 being spread apart. Wing nut 22 can be tightened to maintain arms 12 and 14 at the desired angle.

Fishing line extension component 30 is a solid component comprising notches 32 and 34. O-rings 35 and 37 are provided to assist in the tying process when extension 30 is used. Extension 30, when not in use, is insertable into and stored within section 2. When section 2 is inserted into section 4, jig 1 is compact and easily portable.

Figure 3:
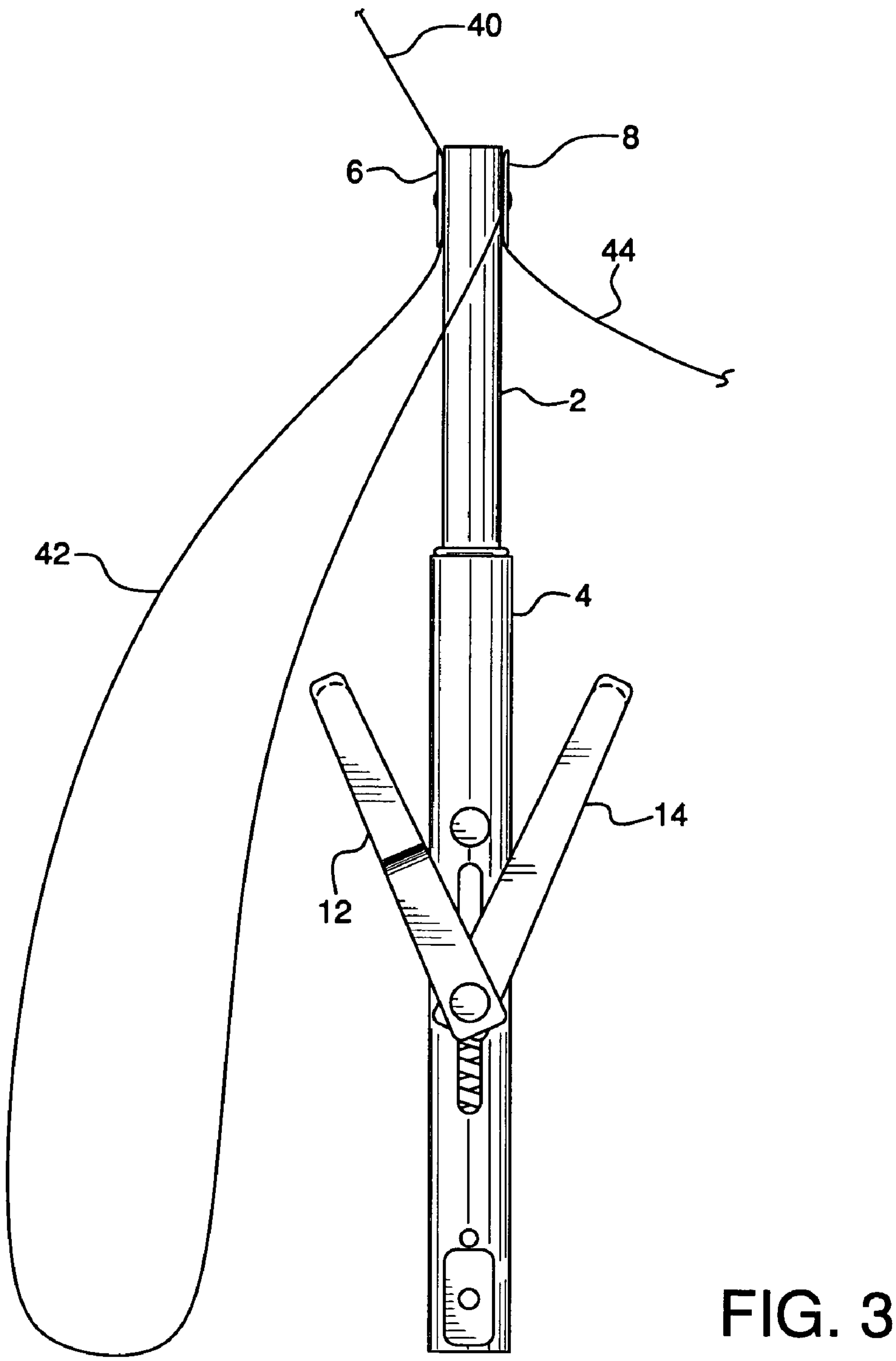
FIG. 3 is a front view of the present invention in use in tying a Bimini twist.
Figure 4:
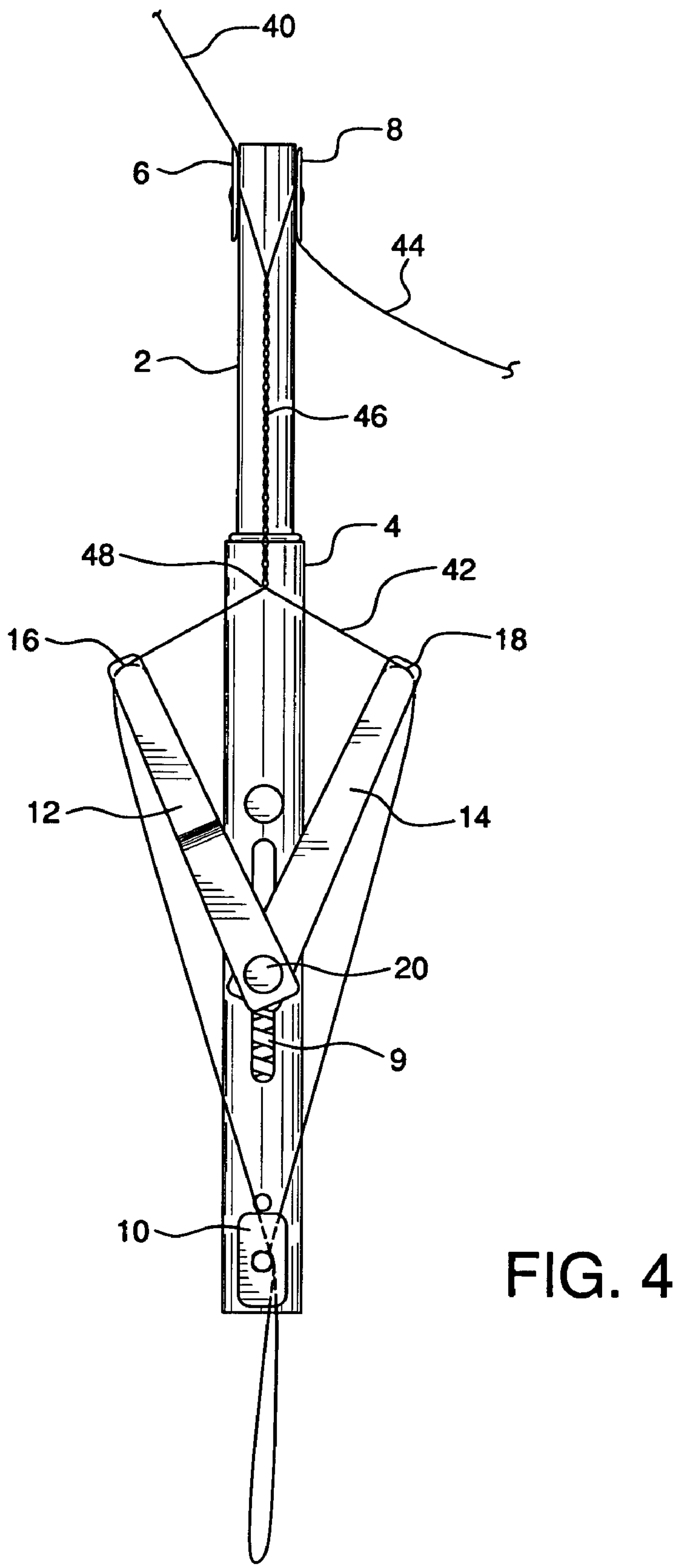
FIG. 4 is a front view of the Bimini twist jig of the present invention in use in the continuing process of tying a Bimini twist.
Figure 5:
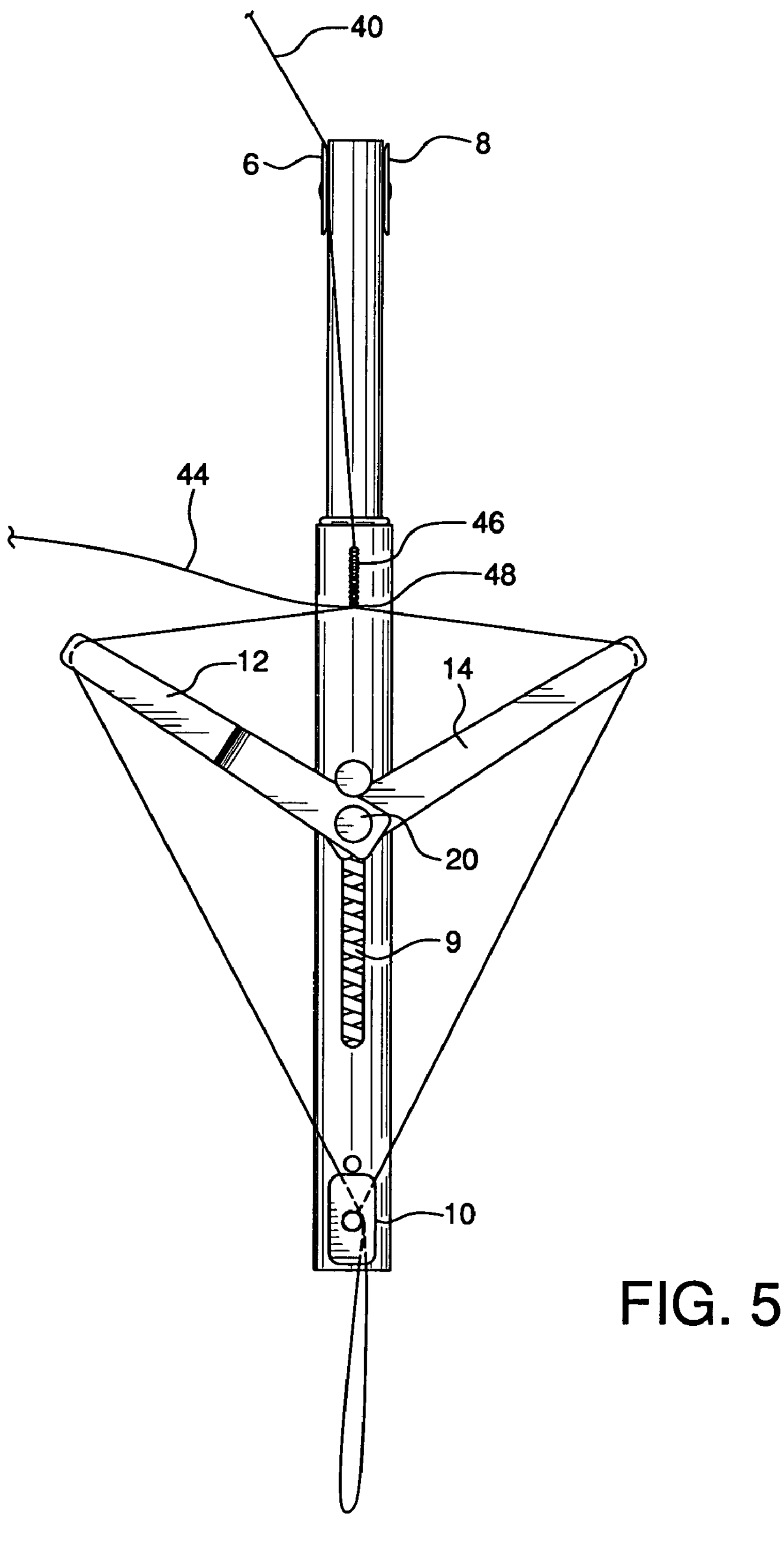
FIG. 5 is a front view of the Bimini twist jig of the present invention in the continuing process of tying a Bimini twist.
Figure 6:
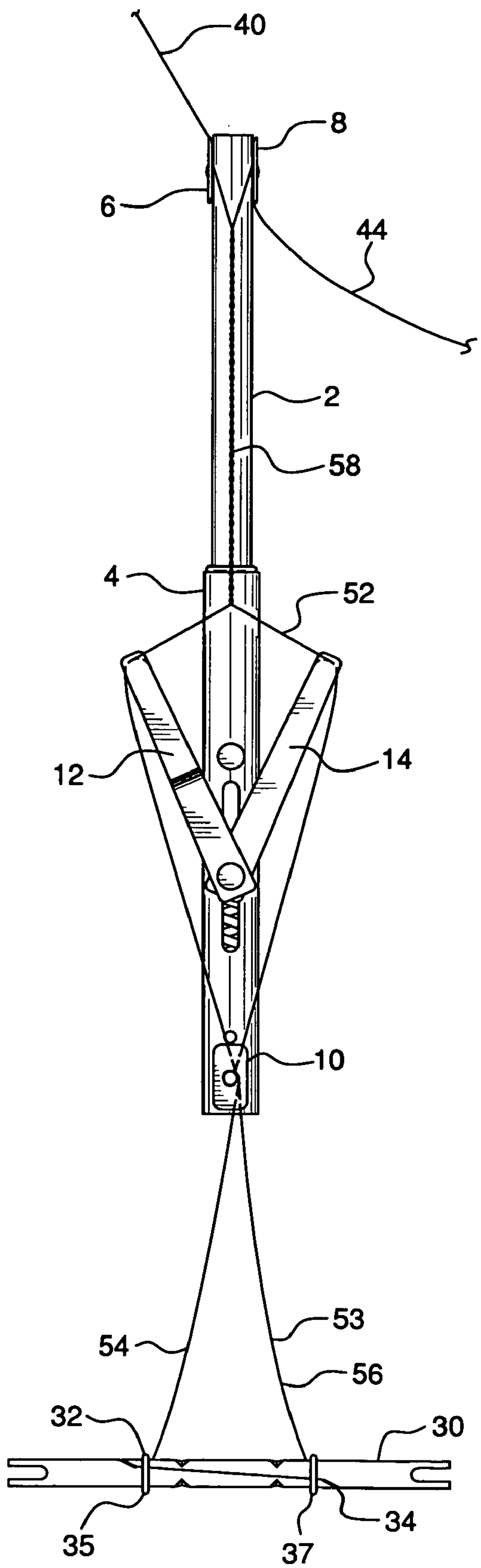
FIG. 6 is a front view of the Bimini twist jig of the present invention in use with the extension component.
Figure 7:
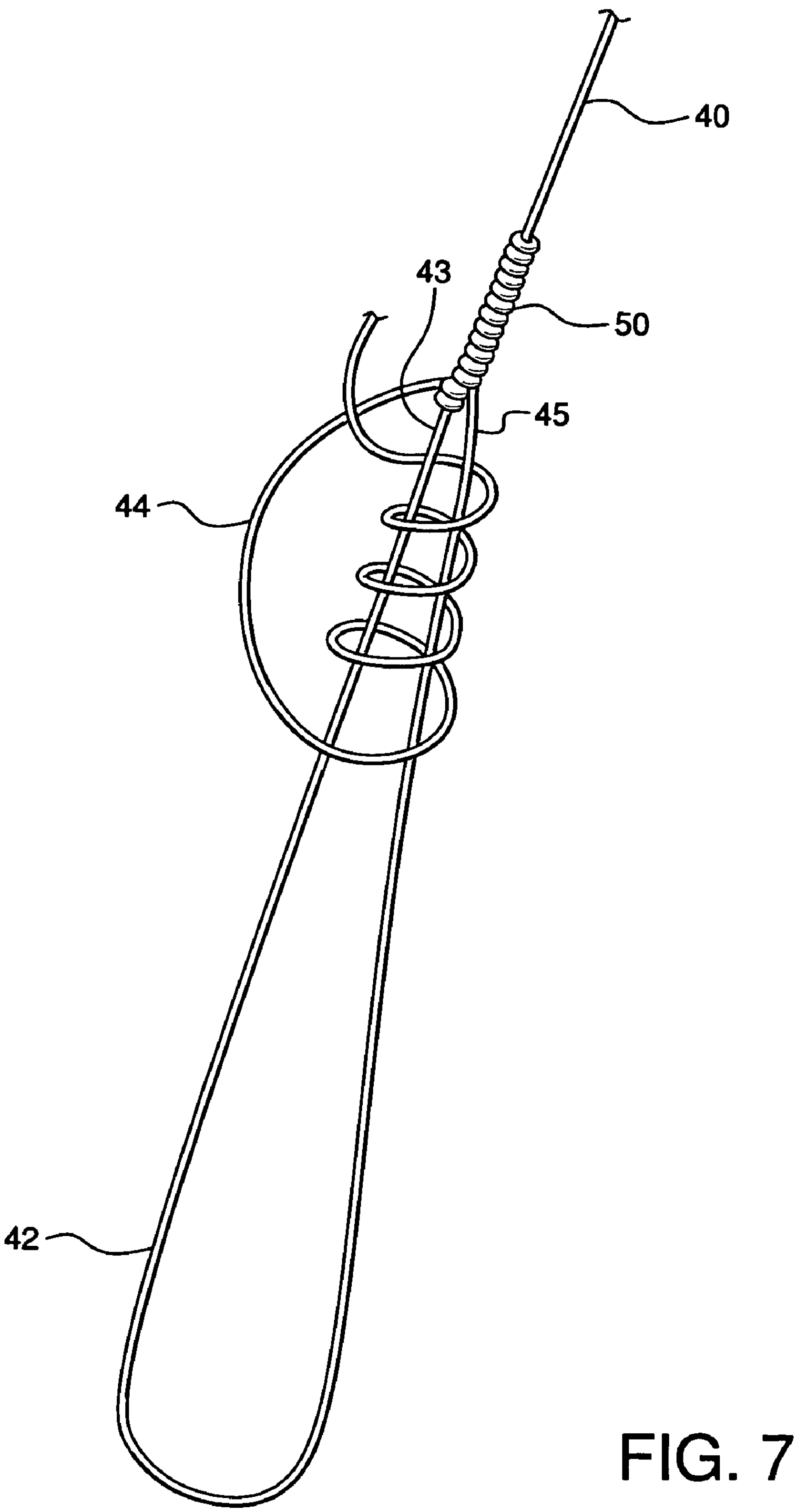
FIG. 7 is a view of the resulting Bimini twist tied by use of the present invention.

In use, the fisherman or other user measures off a given length, i.e. five feet, of fishing line 40 which comes from a fishing pole. Line 40 is wrapped around clip 6 once and, as seen in FIG. 3, large loop 42 is formed when fishing line tag end 44 is wrapped around clip 8. The hand of the user is inserted into loop 42 and he or she twists the loop in a rotating motion approximately twenty times, forming twists 46. The thumb of the user's other hand is placed at the bottom 48 of twists 46, while the user places loop 42 into slots 16 and 18 of arms 12 and 14. Bottom portion 44 of loop 42 is wrapped around clip 10 of section 4. See FIG. 4. Tag line 44 is then unwrapped from clip 8 and pulled out to a 90° angle in relation to jig 1 to tightened twists 46. Wing nut 22 is loosened, causing spring 24 to expand. This allows nut 20 to rise within opening 9 and compels arms 12 and 14 to spread out, as seen in FIG. 5, which further tightens twists 46. At the same time arms 12 and 14 are spreading apart, the user pulls tag line 44 down, resulting in the upper twist portions of twists 46 rolling over the lower twist portions. The user's thumb holds the end 48 of twist 46 as tag line 44 is used to secure the knot by means of half hitch. Arms 12 and 14 are then moved downward along opening 9, causing them to come closer together as bolt 20 moves down opening 9. Wing nut 22 is tightening on bolt 20 and loop 42 is removed from slots 16 and 18 and clip 10. Tag line 44 is then used to tie a half hitch over the two lines 43 and 45 forming the upper part of loop 42, below twist 46. The excess line is then be trimmed from tag line 44. Line 40 is removed from clip 6, which results in loop 42 being secured by a perfect Bimini twist 50.

A longer loop can be secured by use of extension component 30. The process is much the same as previously described, except section 2 is slid up and extended further out of section 4. Larger loop 52 is then initially formed by wrapping line 40 around clip 6 and tag end 44 around clip 8. Loop 52 is then wrapped once around clip 10, leaving about eight to ten inches of lower portion 53 of loop below the clip. One of the lines 54 of lower portion 53 is positioned within notch 32 of extension 30 and is secured by expandable O-ring 55 and the other line 56 of lower portion 53 is put into notch 34 of extension 30 and is secured by expandable O-ring 57. It is contemplated that lower portion 53 and the excess line it forms can be folded around and secured to extension 30, via O-rings 55 and 57, in any variety of ways comfortable to the user.

Loop 52 is then unwrapped off clip 10. The user inserts his or her hand within loop 52, at extension 30 and, as described above, twists the loop in a rotating motion approximately twenty times, forming twists 58. The remaining procedure for completion of the Bimini twist to secure large loop 52 is as previously described.

Jig 1 can readily be used with monofilament or braided lines. Whichever type of line is used, the resulting Bimini twist, properly tied with jig 1, will be strong and perfect for use with any desired fishing connection system.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A Bimini twist jig comprising first and second fishing line retaining sections:

(a) said first section, said first section comprising first attachment means for removeably securing fishing line to the first section, said first section extending from the second section;

(b) said second section comprising second attachment means for removeably securing fishing line to the second section, said second section further comprising tensioning means adjustably mounted on the second section for accepting and guiding fishing line received on the tensioning means and, upon application of tension to fishing line on the tensioning means, for forming a Bimini twist in the fishing line; and (c) biasing means mounted within the second section for providing a compressive force within the second section and on the tensioning means.

2. The jig as in claim 1 wherein the first and second sections are separable components.

3. The jig as in claim 2 wherein the first section is slideably mounted within the second section.

4. The jig as in claim 3 further comprising a fishing line extension component.

5. The jig as in claim 4 wherein the extension component is stored within the first and second sections when not in use.

6. The jig as in claim 1 wherein the tensioning means comprises slots for accepting and guiding fishing line.

7. The jig as in claim 1 wherein the biasing means is a spring.

8. The jig as in claim 1 further comprising a fishing line extension component.

9. The jig as in claim 1 further comprising tightening means for adjustably controlling the tensioning means.

10. The jig as in claim 9 wherein the tightening means is a nut and bolt.

11. The jig as in claim 1 wherein the first attachment means is located near the end of the first section.

12. The jig as in claim 1 wherein the second attachment means is located near the end of the second section.

13. The jig as in claim 12 wherein the second attachment means is located near the end of the second section.

14. A Bimini twist jig comprising:

(a) a first fishing line retaining section with means for removeably securing fishing line to the section;

(b) a second fishing line retaining section with means for removeably securing fishing line to the second section, said first section extending from the second section; and (c) dual arm members extending outwardly from the second section, said arm members being maintained in position on the second section by biasing means which provide a compressive force to the arm members, said biasing means comprising a spring.

15. The jig as in claim 14 wherein the first and second sections are separable components.

16. The jig as in claim 15 wherein the first section is slideably mounted within the second section.

17. The jig as in claim 15 further comprising a fishing line extension component.

18. The jig as in claim 17 wherein the extension component is stored within the first and second sections when not in use.

19. The jig as in claim 14 wherein each of the dual arm members comprises slots for accepting and guiding fishing line.

20. The jig as in claim 14 further comprising means mounted within the second section.

21. The jig as in claim 14 further comprising a fishing line extension component.

22. The jig as in claim 14 further comprising tightening means for adjustably controlling the tensioning means.

23. The jig as in claim 22 wherein the second tightening means is a nut and bolt.

24. The jig as in claim 14 wherein the first attachment means is located near the end of the first section.

25. The jig as in claim 24 wherein the second attachment means is located near the end of the second section.

26. The jig as in claim 14 wherein the second attachment means is located near the end of the second section.

27. The jig as in claim 14 wherein the first attachment means comprises clips.

28. The jig as in claim 14 wherein the second attachment means comprises clips.

29. A Bimini twist jig comprising first section means for attaching fishing line and second section means for attaching fishing line, said first section means extending from said second section means, said second section means comprising tensioning means adjustably mounted on the second section means for accepting and guiding fishing line received on the tensioning means and, upon application of tension to the fishing line from the tensioning means, for forming a Bimini twist in the fishing line, and biasing means mounted within the second section means for providing a compressive force within the second section means and on the tensioning means.

30. The jig as in claim 29 further comprising first attachment means on the first section means for removeably securing fishing line to the first section means.

31. The jig as in claim 30 further comprising second attachment means located on the second section means for removeably securing fishing line to the second section means.

32. The jig as in claim 30 wherein the first attachment means is located near the end of the first section means.

33. The jig as in claim 30 wherein the second attachment means is located near the end of the second section means.

34. The jig as in claim 33 wherein the second attachment means is located near the end of the second section means.

35. The jig as in claim 29 further comprising second attachment means located on the second section means for removeably securing fishing line to the second section means.

36. The jig as in claim 29 wherein the first and second section means are separable components.

37. The jig as in claim 36 wherein the first section means is slideably mounted within the second section means.

38. The jig as in claim 37 further comprising a fishing line extension component.

39. The jig as in claim 38 wherein the extension component is stored within the first and second section means when not in use.

40. The jig as in claim 29 wherein the tensioning means comprises slots for accepting and guiding fishing line.

41. The jig as in claim 29 wherein the biasing means is a spring.

42. The jig as in claim 29 further comprising a fishing line extension component.

43. The jig as in claim 29 further comprising tightening means for adjustably controlling the tensioning means.

44. The jig as in claim 43 wherein the tightening means is a nut and bolt.

45. A Bimini twist jig comprising first section means for attaching fishing line and second section means for attaching fishing line, said first section means extending from said second section means, said second section means comprising tensioning means adjustably mounted on the second section means for accepting and guiding fishing line received on the tensioning means and, upon application of tension to the fishing line from the tensioning means, for forming a Bimini twist in the fishing line, said first and second section means being separable components, wherein the first section means is slideably mounted within the second section means, and a fishing line extension component, wherein said extension component is stored within the first and second section means when not in use.

* * * * *